June 19, 1945.  C. B. BREEDLOVE  2,378,462

THREADED FASTENER

Filed Dec. 6, 1943

Inventor
CHARLES B. BREEDLOVE
By Barthel & Bugbee
Attorney

Patented June 19, 1945

2,378,462

UNITED STATES PATENT OFFICE 2,378,462

THREADED FASTENER

Charles B. Breedlove, Detroit, Mich.

Application December 6, 1943, Serial No. 513,018

1 Claim. (Cl. 151—14)

The present invention relates to threaded fasteners, and more particularly, to threaded fasteners of the friction grip type.

The primary object of the invention is to provide a threaded fastener which will frictionally grip the threads of a bolt during its unthreading rotation, and which will facilitate the easy positioning of the nut on the bolt with substantially little friction so that when the nut is threaded on the bolt it will be practically impossible to remove the same without the use of tools or wrenches.

Another object of the invention is to provide a locking device for nuts having a wrap-around friction member adapted to frictionally engage the threads of the bolt to permit rotation of the nut on the bolt in one direction, and to retard rotation in the opposite direction.

Another objection of the invention is to provide a lock nut assembly of the above-mentioned type in which the wrap-around friction member is partly or wholly concealed in a recess in the top wall of the nut to prevent lateral movement thereof, and to provide an assembly in which a series of nuts may be handled in bulk without the wrap-around friction members becoming entangled with adjacent nuts or adjacent wrap-around friction members of other nuts.

Another object of the invention is to provide a lock nut which comprises comparatively few parts, and which is easy to construct and manufacture at a minimum cost.

Another object of the invention is to provide a lock nut of the above-mentioned type in which the wrap-around friction member will tightly grip the threads of a bolt and prevent the removal thereof when the nut is applied to the bolt, and to provide a wrap-around friction member which may engage the outer edges of the bolt threads, and so arranged as to cross certain threads of the bolt as well as to provide a wrap-around friction member capable of directly engaging the threads so that the wrapping friction will be increased by the greater contact between the threads and the wrap-around friction element.

Another object of the invention is to provide a lock nut of the above-mentioned character, including a nut member having a recess for receiving a wrap-around friction element having one end fastened to the nut by being imbedded therein and locked thereto, while the opposite end of the spiral friction element is free to permit expansion and contraction of the wrap-around friction element when the nut is threaded on a bolt, whereby said friction element will frictionally engage the threaded portion of the bolt if the nut is turned in a direction to unthread the nut from the bolt.

Other objects and advantages of the invention will become apparent during the course of the following description of the accompanying drawing, wherein.

Brief description of the invention

The invention broadly comprises a threaded member, such as a nut, having a recess concentric with the threaded bore of a nut for receiving a spiral wrap-around friction element, one end of which is directly attached or anchored to the nut, while the free end is housed in the lower part of said recess and free to move to permit expansion and contraction of the spiral wrap-around friction element when the nut is threaded on a bolt. Further, the invention comprises a friction wrap-around element formed of spring-like metal which will have slight frictional contacts with the threads of the bolt when the nut is being threaded thereon, and which will frictionally and tightly grip the threads of the bolt when the nut is rotated in an unthreaded direction so as to prevent displacement or removal of said nut and product a self-gripping action between the spiral wrap-around friction element and the threads of the bolt.

A nut body is provided with a relatively deep recess for a certain type of nut where it is desired to house the entire friction wrap-around element and conceal the same so as to be completely out of the path of other nuts during the handling of the nuts in bulk.

Detailed description of the invention

In the preferred embodiment of the invention shown in Figures 1 to 4 inclusive, a nut body 5 is provided with the usual threaded bore 6 for being received on a bolt or the like as at 7. The nut may be of any desired polygonal shape and is formed in its top wall with a recess 8 slightly larger than and concentric with the threaded bore 6. The threaded portion of the bolt 9 projects a slight distance through the bore 6, and said threaded portion has the same number of threads to the inch as the bore 6 as in conventional nut and bolt structures.

Figure 1:
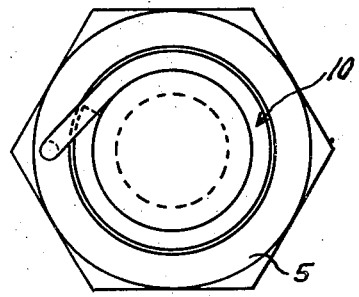
Fig. 1 is a top plan view of a preferred embodiment of the invention.
Figure 2:
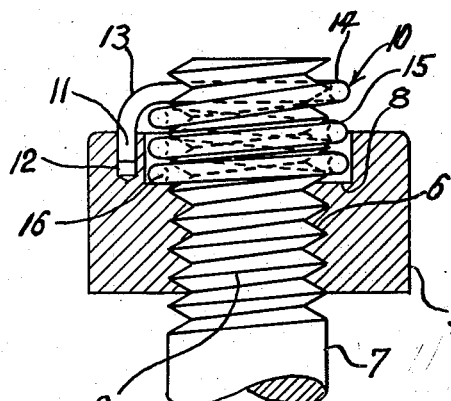
Fig. 2 is a cross-sectional view of the nut shown in Fig. 1, showing the manner in which the spiral friction member is attached thereto and arranged to engage the threads of the bolt.

A friction wrap-around element 10 has one of its ends, as at 11, imbedded and locked in an opening 12 in the top wall of the nut so that the upper portion of the end 11 can be bent as at 15 to extend around the bolt threads 9 in a clockwise direction, thus forming a top convolution 14 which crosses the thread 9 and frictionally engages the same, as is clearly shown in Fig. 2. The top convolution is continued to a second convolution 15 which likewise crosses the thread and terminates in a lower convolution 16 with the free end received in the recess 8. As shown in Fig. 2, the convolutions 15 and 16 are likewise housed in the recess 8 and only a portion of the top convolution is exposed and extends above the top of the nut body 5 so as to be removed from the path of obstructions or the wrap-around friction elements of adjacent nuts when the nuts are uncoupled and handled in bulk.

In operation, the nut is threaded on the bolt 5 with the convolutions 14, 15 and 16 of the spiral wrap-around element 10 frictionally engaging the threads of the same to permit the nut to be easily threaded on the bolt and tightened down in place. If, after the nut has been tightened as above described, the nut should rotate in a reverse direction, such rotation would be restrained by means of the spiral wrap-around gripping member 10 by means of an increased friction due to the wrapping around of the convolutions 14, 15 and 16 about the threaded portion of the bolt.

Figure 5:
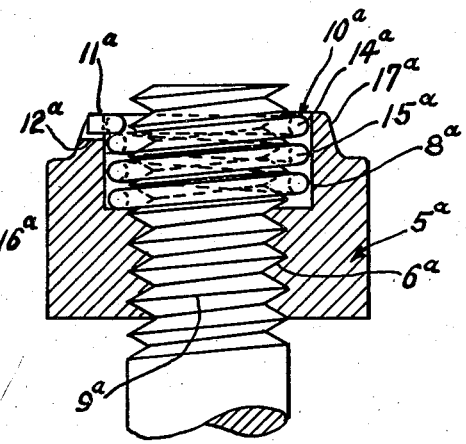
Fig. 5 is a cross sectional view of a modified form of the invention showing another manner of anchoring the wrapping friction element to the nut body.
Figure 3:
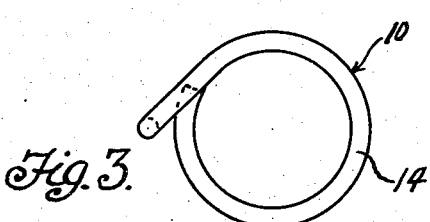
Fig. 3 is a top plan view of the wrapping friction element, showing the manner in which the same is coiled to wrap around the threads of a bolt when the bolt is located in an unthreading direction.
Figure 4:
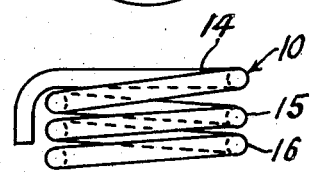
Fig. 4 is a side elevational view of the spiral wrapping friction element similar to Fig. 3.

In the modified form, shown in Fig. 5, the bolt body 5a is provided with a threaded bore 6a, and the top wall of the nut is slightly reduced and tapered so as to provide a portion 17a extending a considerable distance along the bolt. A concentric bore 8a is formed in the nut body 5a for receiving a spiral wrap-around friction element 10a similar to that shown in Figures 1 to 4 inclusive. The bolt 9a is threaded with the same number of threads per inch as the bolt 5a in the conventional manner.

The wrap-around friction element 10a is provided with a radially extending projection 11a adapted to be received in an opening 12a in the tapered wall or portion 17a of the nut body and said portion 17a may be anchored in place by pounding the edge 17a so as to lock the spiral wrap-around friction element in place in substantially the same manner as the portion 11 of the spiral wrap-around friction element 10 in Figures 1 to 4 inclusive. The spiral wrap-around friction element shown in Fig. 5 comprises a top convolution 14a which crosses the threads of the bolt 9a and extends in a clockwise direction for a portion of its circumference in a substantially horizontal plane. The top convolution is connected to a lower convolution 15a housed within the recess 8a and terminates in a lower convolution 16a encircling the thread of the bolt 9a and crossing the same at various points to provide friction surfaces at said points of crossing and allow gripping of the threads by the spiral wrap-around friction element when the nut 5a is rotated in a counterclockwise direction. The extreme free end of the lower convolution 16a is free to permit slight movement thereof during the contraction of the spiral wrap-around friction element should the nut slightly rotate in a counter-clockwise direction, and to permit expansion when the nut is threaded on the bolt or rotated in a clockwise direction. In the form of the invention shown in Fig. 5 the spiral wrap-around friction element 10a is completely housed in the recess 8a so as to be wholly removed from obstructions when the nuts are handled loosely or in bulk form, and to prevent the entangling of the spiral wrap-around friction members when the nuts are packed or shipped.

Figure 6:
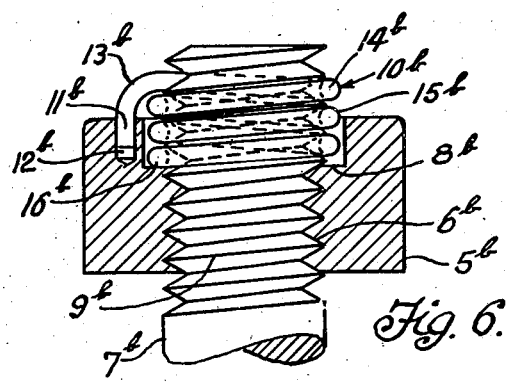
Fig. 6 is a cross-sectional view of another modified form of the invention showing the wrapping friction element shaped to conform to the threads of the bolt and to be received between and gripped by the angular portions of the bolt thread.

In the other modified form of the invention shown in Fig. 6, the nut 5b and bolt 9b are similar to the assembly shown in Fig. 2 and the threads 6b of the nut are complementary with the threads 9b of the bolt. The top wall of the nut 5b is recessed as at 8b for receiving a spiral wrap-around friction element 10b with its convolutions 14b to 16b inclusive lying between the threads of the bolt 9b so as to frictionally engage the same. The spiral wrap-around friction element 10b is slightly smaller in diameter than the one shown in Fig. 2, and the top convolution 14b is provided with an offset portion 11b bent as at 13b to be received in an opening 12b in the top wall of the nut. The extension 11b may be anchored in place by striking a blow against the edge of the nut 5b adjacent the opening 12b so as to crowd the metal in the adjacent area into frictional locking engagement with the extension or projection 11b. The free end of the spiral wrap-around friction element 10b is received in the recess 8b and is free to allow expansion and contraction of the convolutions 14b, 15b and 16b during the threading of the nut on the bolt. In all forms of the invention the spiral wrap-around element is formed of a relatively light metal spring element having a certain degree of resiliency so as to assume its normal shape and yet be free to permit movement such as expansion and contraction of the convolutions to frictionally grip the nut and lock the same in place on the bolt. Also, in all forms one end of the spiral wrap-around friction element is fastened to the nut body while the other end is free to move so as to allow for contraction and expansion and secure a tight grip on the bolt when the nut is accidentally rotated in a direction for unthreading.

It is to be understood, that the forms of the inventions herewith shown and described are to be taken as preferred embodiments of the same and that various changes in the size, shape and arrangement of parts may be resorted to without departing from the spirit of the invention or the scope of the subjoined claim.

What I claim is:

A coupled nut and bolt, comprising a nut member having a threaded bore terminating at one end in an enlarged bore of greater diameter, a wrapping friction element for frictionally engaging a portion of said bolt when received in said threaded bore, said wrapping friction element comprising a spirally coiled piece of resilient wire with the upper convolution attached to the nut member and the lower convolution freely received in said enlarged bore, the extreme free end of said spirally coiled piece of wire being arranged in said enlarged bore for free movement to permit said wrapping friction element to contract and frictionally engage said bolt when the nut member is turned in an unthreading direction, said spirally coiled wire having certain of its convolutions adjacent its upper end spaced various distances apart to permit said convolutions to cross one of the threads of said bolt and frictionally overlap the same, the convolutions of the lowermost portion of said spirally coiled friction gripping element being of substantially the same pitch as the threaded bore to initiate thread engagement during the coupling of said coupled nut and bolt.

CHARLES B. BREEDLOVE.